(12) United States Patent
Brackney

(10) Patent No.: US 9,456,183 B2
(45) Date of Patent: Sep. 27, 2016

(54) IMAGE PROCESSING OCCUPANCY SENSOR

(75) Inventor: Larry J. Brackney, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 1321 days.

(21) Appl. No.: 12/947,045

(22) Filed: Nov. 16, 2010

(65) Prior Publication Data

US 2011/0115910 A1    May 19, 2011

Related U.S. Application Data

(60) Provisional application No. 61/261,667, filed on Nov. 16, 2009.

(51) Int. Cl.
| | |
|---|---|
| H04N 7/18 | (2006.01) |
| G06K 9/00 | (2006.01) |
| H05B 37/02 | (2006.01) |
| G01M 1/38 | (2006.01) |

(52) U.S. Cl.
CPC .......... *H04N 7/183* (2013.01); *G06K 9/00771* (2013.01); *H05B 37/0227* (2013.01); *H05B 37/0245* (2013.01)

(58) Field of Classification Search
CPC ... H04N 7/18; H04N 7/188; G08B 13/19656
USPC ............................ 348/143, E07.085; 382/103
See application file for complete search history.

(56) References Cited

U.S. PATENT DOCUMENTS

| | | | |
|---|---|---|---|
| 5,528,698 A | 6/1996 | Kamei et al. | |
| 5,715,325 A * | 2/1998 | Bang et al. | 382/118 |
| 7,596,242 B2 | 9/2009 | Breed et al. | |
| 2005/0092259 A1 * | 5/2005 | Pylant | 119/712 |
| 2007/0233323 A1 * | 10/2007 | Wiemeyer et al. | 700/276 |
| 2008/0106599 A1 * | 5/2008 | Liu et al. | 348/143 |
| 2009/0027521 A1 * | 1/2009 | Fukumoto | 348/241 |
| 2009/0231427 A1 * | 9/2009 | Fitzgibbon et al. | 348/143 |
| 2012/0206605 A1 * | 8/2012 | Buehler et al. | 348/159 |

OTHER PUBLICATIONS

How ambient intelligence will improve habitability and energy efficiency in buildings. By Ahrens et al., Jan. 1, 2005 Center for Building Environment UC Berkeley.*

Sensor-based occupancy behavioral patterns for energy and comfort management in intelligent buildings. By Bing Dong, Burton Andrews. Center for Building Performance and Diagnostics, Carnegie Mellon University, Pittsburg, PA, USA 15213 BOSCH Research and Technology Center, Pittsburg, PA, USA 15212.*

A Robust Human Detection and Tracking System using a Human-Model-Based Camera Calibration Zhong Zhang, Peter L. Venetianer, Alan J. Lipton, Object Video Inc.*

(Continued)

*Primary Examiner* — Dave Czekaj
*Assistant Examiner* — Dramos I Kalapodas
(74) *Attorney, Agent, or Firm* — Robert G. Pittelkow

(57) ABSTRACT

A system and method of detecting occupants in a building automation system environment using image based occupancy detection and position determinations. In one example, the system includes an image processing occupancy sensor that detects the number and position of occupants within a space that has controllable building elements such as lighting and ventilation diffusers. Based on the position and location of the occupants, the system can finely control the elements to optimize conditions for the occupants, optimize energy usage, among other advantages.

16 Claims, 9 Drawing Sheets

(56) References Cited

OTHER PUBLICATIONS

Presence Detection and peerson identification in Smart homes. By B. Ivanov, H. Ruser, M. Keller. Neubiberg, University of Bundeswehr Munich, Passau, FORWISS, University Passau.*

Audin, L., "Occupancy Sensors: Promises and Pitfalls," E-Source Tech Update, TU-93-8, Boulder, CO 1999.

Brackney, L. et al. "Fuzzy-Based Self-Organizing Control for Building Systems," Proceedings of the 1994 American Controls Conference, v. 3, pp. 3060-3064.

Canny, J., "A Computational Approach to Edge Detection," IEEE Trans. Pattern Analysis and Machine Intelligence 8, pp. 679-714, 1986.

Dodier, R. et al., "Buliding occupancy detection through sensor belief networks," Energy and Buildings vol. 38, Issue 9, Sep. 2006, pp. 1033-1043.

Lindeberg, T., "Detecting Salient Blob-Like Image Structures and Their Scales with a Scale-Space Primal Sketch: A Method for Focus-of-Attention," International Journal of Computer Vision 11 (3), pp. 283-318, 1993.

Mahalanobis, A. et al., "Network Video Image Processing for Security Surveillance, and Situational Awareness," Proc. SPIE Defense and Security Symp., SPIE Press, pp. 1-8, 2004.

Maniccia, D. et al., "The effects of changing occupancy sensor timeout setting on energy savings, lamp cycling, and maintenance costs," IES Paper #42, pp. 1-24, Aug. 16, 2000.

Prepared by TIAX LLC for U.S. Dept. of Energy Building Technologies Program, "Energy Impact of Commercial Building Controls and Performance Diagnostics: Market Characterization, Energy Impact of Building Faults and Energy Savings Potential," U.S. Department of Energy Building Technologies Program, pp. 304-307, Nov. 2005.

Clayton, D. et al., "Building Automation Systems Worldwide Outlook Market Analysis and Forecast Through 2006," ARC Advisory Group, p. 33, 2002.

* cited by examiner

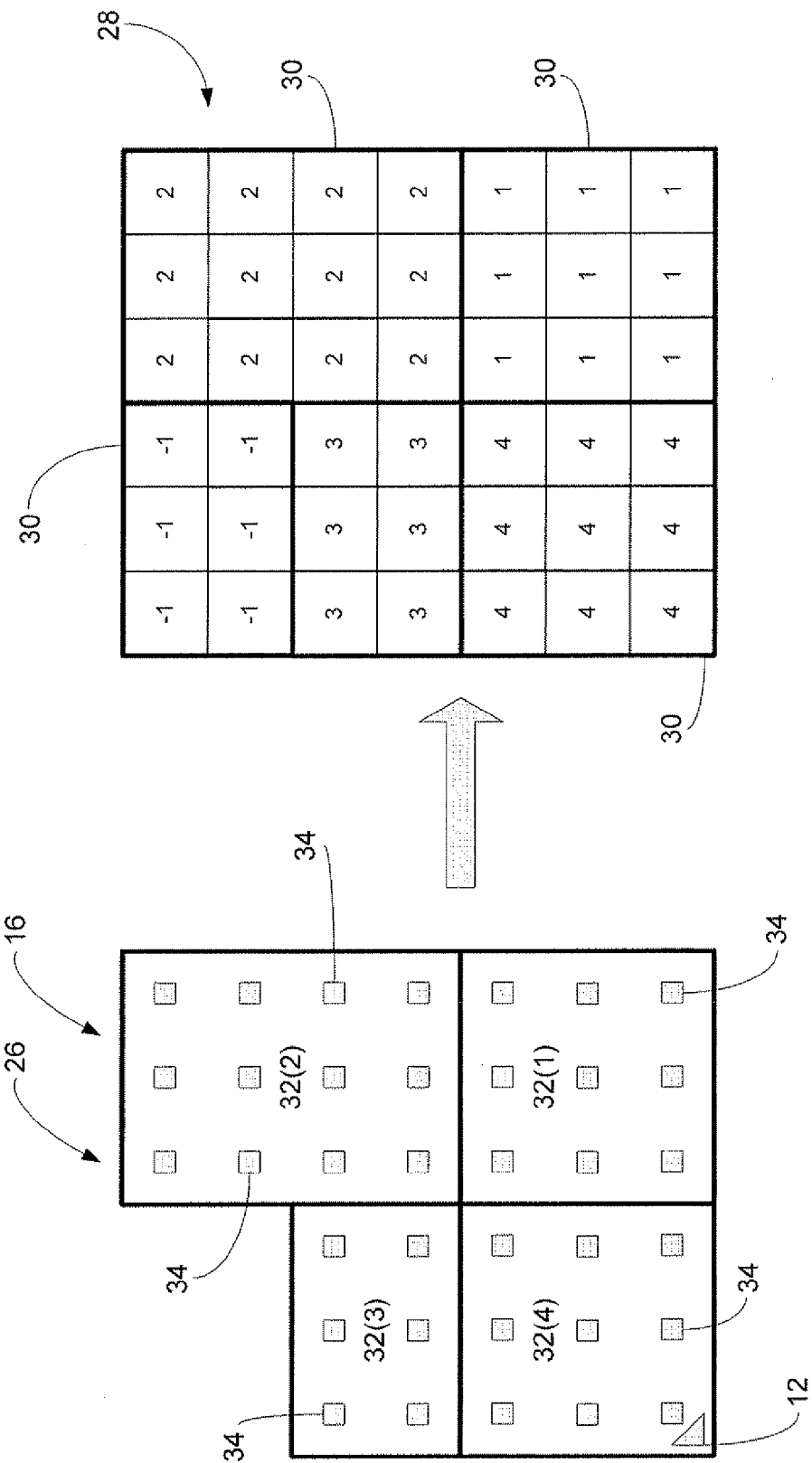

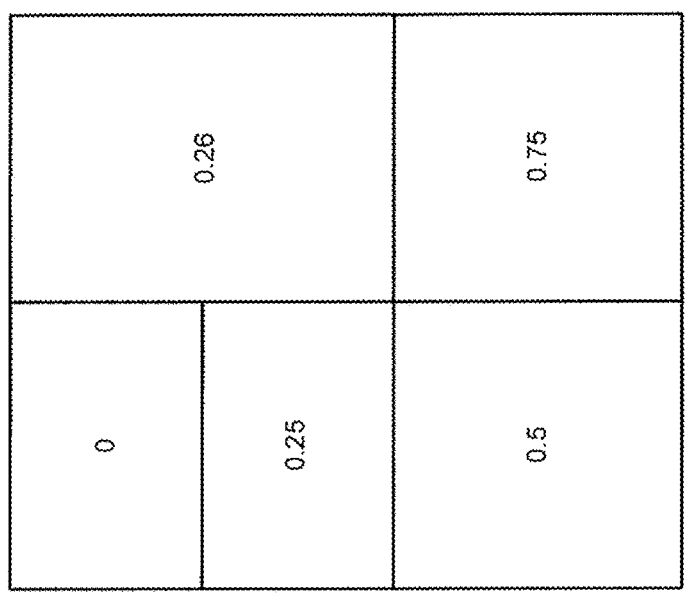
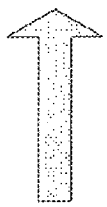
FIG. 11

IMAGE PROCESSING OCCUPANCY SENSOR

CROSS-REFERENCE TO RELATED APPLICATION

The present application is a non-provisional application claiming priority under 35 U.S.C. §119(e) to provisional application No. 61/261,667 utility filed Nov. 16, 2009, which is hereby incorporated in its entirety by reference herein.

The United States Government has rights in this invention under Contract No. DE-AC36-08GO28308 between the United States Department of Energy and the Alliance for Sustainable Energy, LLC, the Manager and Operator of the National Renewable Energy Laboratory.

FIELD

The present disclosure generally relates to image processing occupancy sensors and building management systems and methods.

BACKGROUND

Building automation systems are a common feature in many commercial buildings and are becoming more common in residential buildings. Generally speaking, a building automation system or "BAS" includes computer hardware and software that monitors and controls various possible mechanical and electrical systems in a building. For example, the BAS may involve a computer system in communication with heating and lighting control systems. Occupancy sensing through either ultrasonic or infrared based sensors is a common feature of many BAS. With occupancy sensing, a BAS is able to provide lighting control and climate control taking into account the presence or absence of occupants.

Conventional BAS systems using ultrasonic or infrared occupancy sensing, however, suffer from some drawbacks. Conventional occupancy sensing systems often suffer from false positives—falsely identifying an occupant in a space or falsely indicating a space is empty. For example, conventional occupant systems can lose track of an occupant in a space when an occupant is within a space but is still, such as when someone is sitting still at their desk. Similarly, a blowing curtain can falsely be detected as the presence of an occupant in a space. False positives often result in inefficient building control and can cause occupants to temporarily or permanently disable the sensor.

Sensor manufacturers and BAS engineers have ameliorated some of the shortcomings in conventional occupancy sensing systems through sensitivity adjustments, e.g., more or less motion over more or less a period of time required to trigger a sensor, and motion time-outs, e.g., if no motion is detected for a period of time then assume no occupant, as well as complex advanced signal processing, fuzzy logic, and probabilistic models. While some of these improvements to conventional occupant sensors may prove beneficial, shortcomings in such systems persist.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 4 is a top view of graphical user interface for a user to define a space including controllable elements in the building system environment, the space subdivided into regions;

FIG. 5 is a zone map of the space of FIG. 4, the zone map defining cells within each region;

FIG. 11 illustrates the zone map with the mean of the normalized data applied on a region-by-region basis, the region-by-region mean values providing, directly or indirectly, control attributes for the building automation system to control various possible controllable elements, such as dimmable lighting ballasts, ventilation diffusers, heating, cooling, and daylighting applications associated with the space, each region, or each cell.

Corresponding reference characters and labels indicate corresponding elements among the view of the drawings. The headings used in the figures should not be interpreted to limit the scope of the claims.

SUMMARY

Figure 1:
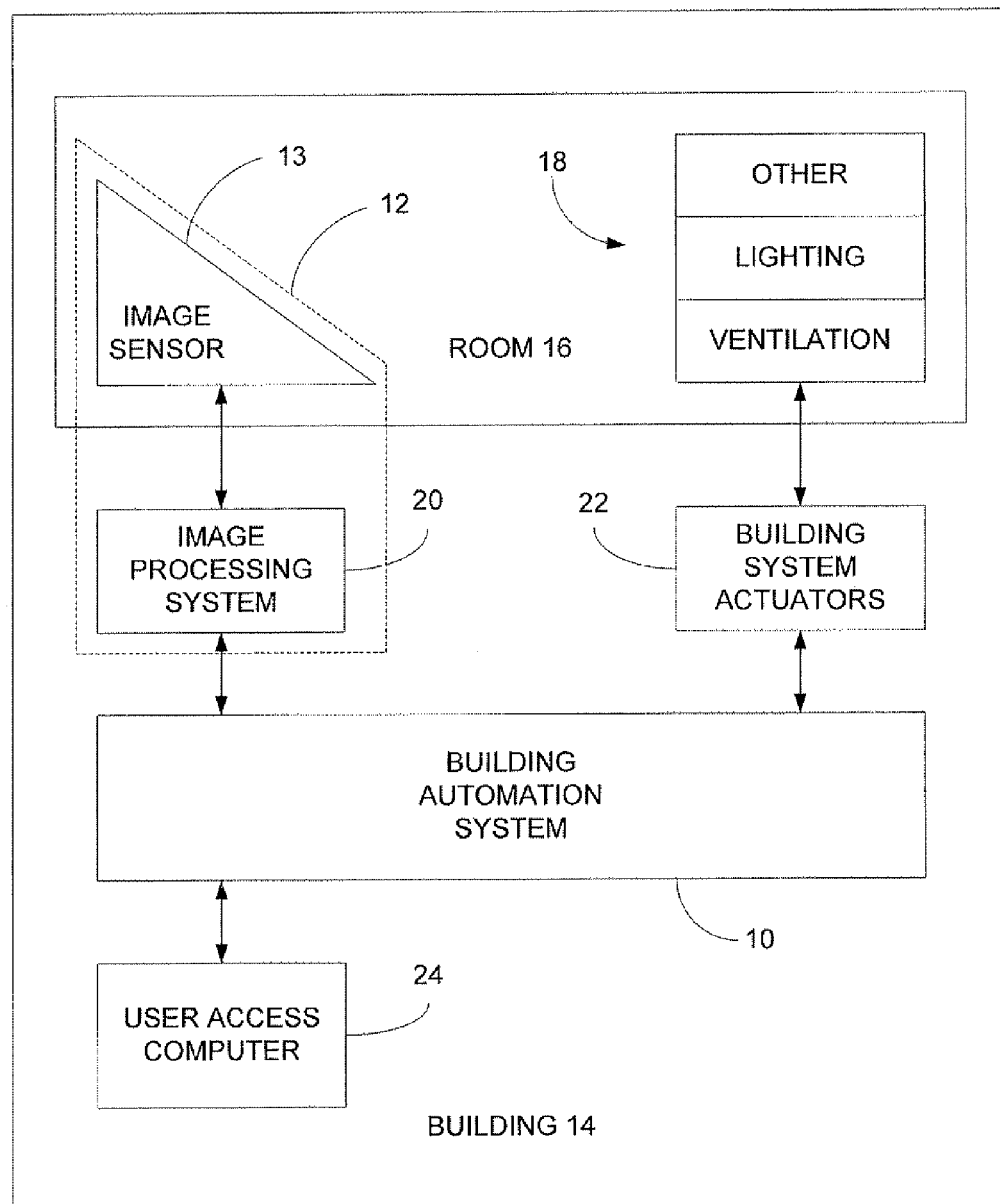
FIG. 1 is a system diagram illustrating an image processing occupancy sensor in a building automation system environment.

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the present disclosure involves a method of controlling building equipment that comprises receiving an image from an image sensor placed in a space associated with the building. The image includes information representative of one or more occupants in the space. At a first processor coupled with a memory storing the image, the method involves determining, from the image, a presence of one or more occupants within the space. Based on the presence of occupants in the space, the method further involves providing a control signal to one or more controllable building elements, e.g., lighting or ventilation, based on the presence of the occupant within the space. The method may further involve determining a position of the one or more occupants in the space. Further, from a second processor in communication with the first processor, such as a BAS, providing the control signal to the one or more controllable building elements based on the position of the occupant in the space.

Another aspect of the present disclosure involves a building management system comprising an image processing occupancy sensor. The image processing occupancy sensor includes at least one image sensor and at least one first microprocessor coupled with at least one memory. The microprocessor and memory are configured to receive and store an image from the image sensor, the at least one memory including computer executable instructions including a first set of instructions to identify an occupant within the image and a second set of instructions to determine the position of an occupant in a space associated with the image processing occupancy sensor and provide data indicative of the position of the occupant in the space.

In addition to the exemplary aspects and embodiments described above, further aspects and embodiments will become apparent by reference to the drawings and by study of the following descriptions.

DETAILED DESCRIPTION

A need exists for systems and methods that detect occupancy using image processing. Such systems and methods can control, at different levels of specificity, elements in a space such as lighting and ventilation diffusers, based on the presence of an occupant as detected by the image processing occupancy sensor and related components. Such systems and methods can further use the image data to not only detect the presence of one or more occupants in the space but also determine the occupants' position within the space. Based on position, fine grained control of various elements is possible. For example, lighting control in a space may be based on the position of occupants in the space, with lighting elements nearer to the occupant brighter than lighting elements further from the occupant. Moreover, other inputs, such as those related to temperature, daylighting conditions, $CO_2$, user activity and the like may be used in conjunction with image based occupancy detection data to provide element control. For example, daylighting may be detected by the image processing system or otherwise provided, and used in conjunction with the lighting control to decrease lighting based on occupancy data and daylighting data (during bright days) or increase lighting based on occupancy and daylighting data (during darker days).

Figure 2:
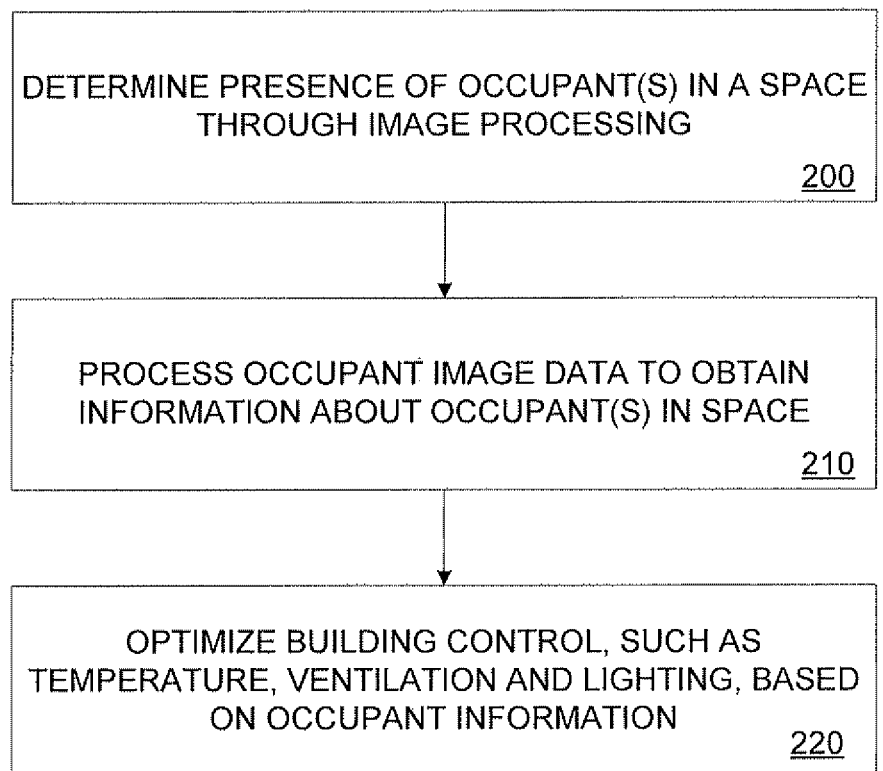
FIG. 2 is a flowchart illustrating a method of occupant detection and using the detection to control building elements.

FIG. 1 is a system diagram illustrating a building automation system (BAS) 10 and related components, including an image processing based occupancy sensor 12, deployed in a building 14. FIG. 2 is a flowchart describing one possible method conforming to aspects of the present disclosure. Referencing FIGS. 1 and 2 and more particularly, the image processing occupancy sensor (IPOS) is deployed in a room 16 of the building 14. The IPOS 12 may include any number of different analog or digital image capture devices including a charge coupled device (CCD) and a complimentary metal-oxide-semiconductor (CMOS) active pixel sensor. The IPOS is positioned within the room 16 or other space of the building such that a field of view of the sensor encompasses portions of the space where a controllable element 18, such as ventilation or lighting, is provided and under control of the BAS. In various possible implementations, one or more IPOS may be positioned within a space having controllable elements, and the IPOS may be indoors or outdoors. Examples of controllable elements include fans, dampers, lighting fixtures, air handling units, heating and cooling systems and hot water systems. The IPOS device is configured to detect the presence of one or more persons within the room or other space (operation 200).

The IPOS device, includes, is coupled, or otherwise is in communication with an image processing system 20. The image processing system may include a processor in communication with memory, whether on board the processor or connected thereto, and various other electronic components to interact with the image sensor and to communicate with the BAS. The IPOS device may be positioned on the same printed circuit board or otherwise proximate to the image processing system or the image processing system may be remote and physically separate from the IPOS. In one implementation, the image sensor is deployed in a stand-alone frame structure that may be mounted in a desired building location. The image sensor may communicate with the image processing system by way of wired or wireless Ethernet, Bluetooth, Zigbee, MSTP or other communication arrangements. In such an implementation, the term IPOS encompasses both the image sensor and the image processing system.

While FIG. 1 illustrates a single image sensor 13 and image processing system 20 in communication with the BAS, implementations of the systems described herein may include any number of IPOS devices. The IPOS devices may include dedicated image processing systems. It is also possible to couple a plurality of sensors to an image processing system subject to the processing and memory constraints of the image processing system as well as other factors. In one particular arrangement, the image processing system includes an embedded microcontroller that processes the image data from the image sensor to extract occupant and other information. The image processing system, in this particular implementation, communicates with the BAS over a conventional protocol such as BACnet over wired or wireless transport layers. Irrespective of the deployment of IPOS devices, a given image processing system communicates with the BAS and provides image information gathered from the IPOS to the BAS. The IPOS processes the image data to extract information about the occupation of the space (operation 210). For example, the IPOS may determine the number of occupants in the space, the location of the occupants in the space, the centroid occupancy, space luminance, and/or other information and pass that information to the BAS.

Based on the processed image data and occupant information derived therefrom, the BAS is able to optimize building control (operation 220). For example, the BAS generates a control signal delivered to a building system actuator 22 that produces the appropriate outputs to operation ventilation systems in a space. It is also possible to configure the image processing system 20 or some other processing element or combination of processing elements, which may be in any form of communication (e.g., wired network connection, direct connection, wireless connection) with the sensor device, to process the image data to determine occupant position, movement, centroid of occupancy, luminance and other occupant and space information based on the image capture.

To illustrate aspects of the disclosure, in one possible implementation, a large room is configured with a number of individually dimmable lighting elements, such as a dimmable ballast. A dimmable lighting element typically includes some form of lighting element, such as an incandescent bulb, a light emitting diode light, or a fluorescent bulb, that provides a controllable amount of voltage and current to the lighting element so that the lighting element may be controlled (dimmer or brighter). The BAS system, in response to processing the image data, provides control signals to the lighting elements to individually control the light provided from each lighting element. Hence, as discussed herein, lighting within a space can be tailored based on occupancy as well as other factors.

Figure 3:
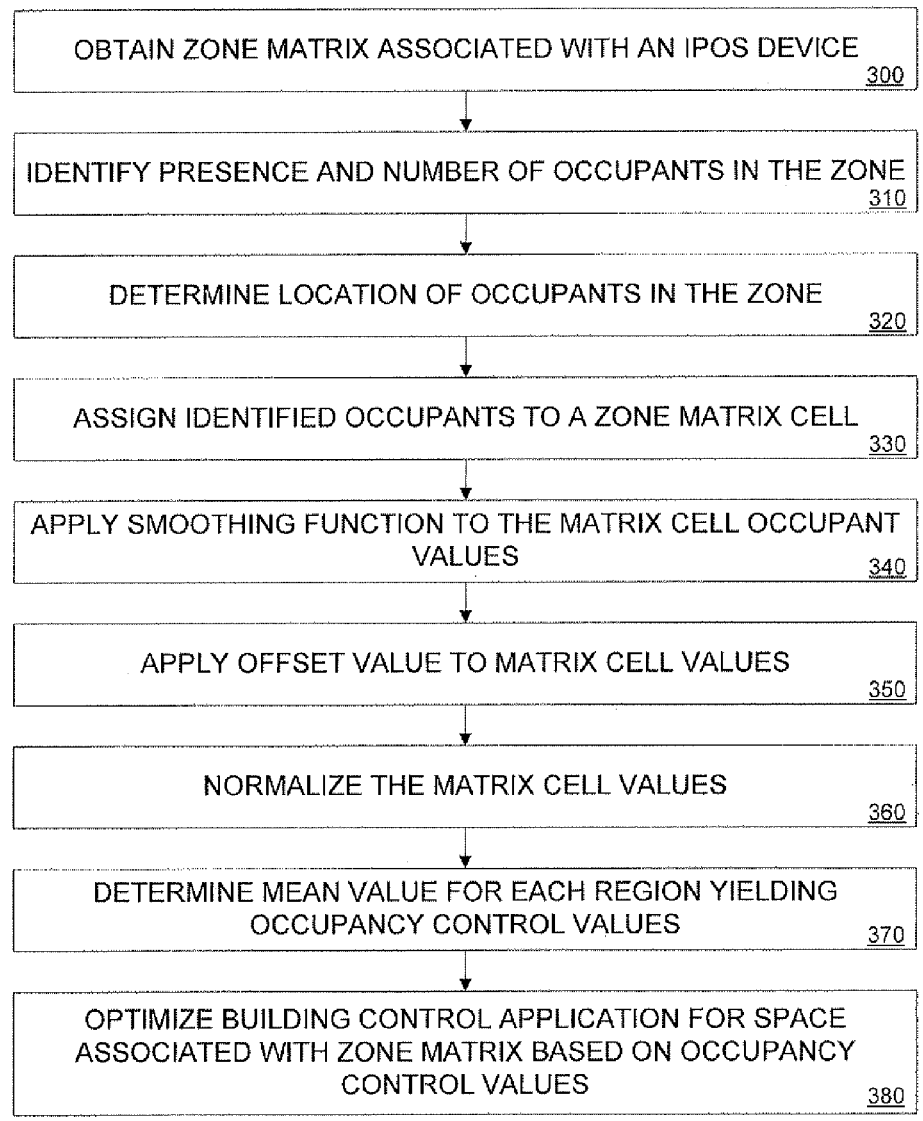
FIG. 3 is a flowchart illustrating a method of occupant detection and position identification to control building element.

FIG. 3 is a flowchart illustrating one particular method conforming to aspects of the present disclosure. The various operations recited in FIG. 3 are discussed herein with reference to the diagrams set forth in FIGS. 4-10. Referring now to these figures as well as earlier discussed FIGS. 1 and 2, prior to capturing and processing image data or any form of resulting building control, a space under control of a BAS system and including an IPOS device is associated with a zone map or matrix for the space (operation 300). In one particular implementation, a zone map for a particular space is generated by way of user interaction with an application accessible at a monitor, a personal computer or other interface 24 connected to the BAS 10. The user accesses a zone map template by way of a graphical user interface (GUI) where the user is able to define a space having an IPOS and may further define regions of the space and cells within each space.

FIG. 4 illustrates a space 26 that includes an IPOS device 12 and FIG. 5 illustrates a matrix 28 associated with the space. The matrix is provided as a programmable or definable template at the GUI; initially, the user establishes the overall dimensions of the space and arranges the matrix in accordance with the dimensions and geometry of the space. The overall space is presented as a matrix with a plurality of cells 30. The cells may be clustered or otherwise associated with regions 32 of the space and matrix. Each cell, in one implementation, may be associated with a controllable element either within the cell or otherwise associated with the cell or the region that includes the cell. For purposes of example, FIG. 4 illustrates dimmable lighting elements 34 in one-to-one correspondence with cells 30. Other forms of controllable elements are possible and it is not necessary that there be one-to-one correspondence. Generally speaking, regions will include various controllable elements in some form of arrangement and cells will be defined, perhaps automatically once the space geometry and IPOS location is defined, in a distribution associated with occupancy and not necessarily in alignment with controllable element locations. In FIG. 5, each cell is associated with a respective region. More specifically, region 1 includes 9 cells (each labeled 1), region 2 includes 12 cells (each labeled 2), region 3 includes 9 cells (each labeled 3), and region 4 includes 6 cells (each labeled 4). There is a region of the space that is not open or otherwise visible to the IPOS (the space could be associated with a wall for example) and the cells in that region are labeled −1. Hence, the overall space footprint is defined by regions 1-4.

In operation, the IPOS detects the presence of an occupant or occupants within the space (operation 310). The system may also detect the number of occupants. It is also possible that the IPOS will be configured to detect other characteristics of the room, such as thermal changes (if the IPOS has infrared spectral characteristics or is functionally connected to device that can detect thermal changes and ambient lighting) or luminance either alone or in conjunction with detecting the presence of an occupant within the room. The IPOS 12 is positioned within the space 26 such that a field of view of the IPOS device encompasses an area of the associated matrix. The image data gathered form the IPOS device is temporarily saved in the memory of the image processing system 20. Image data may be gathered and saved at various times and in response to various triggers. For example, the image data may be captured and loaded into memory at regular intervals, intermittently captured and loaded into memory upon detection of movement, in response to detection of a change in light (e.g., in a daylighting application) and some combination of regularly and in response to triggers from the space, or otherwise.

Figure 6A:
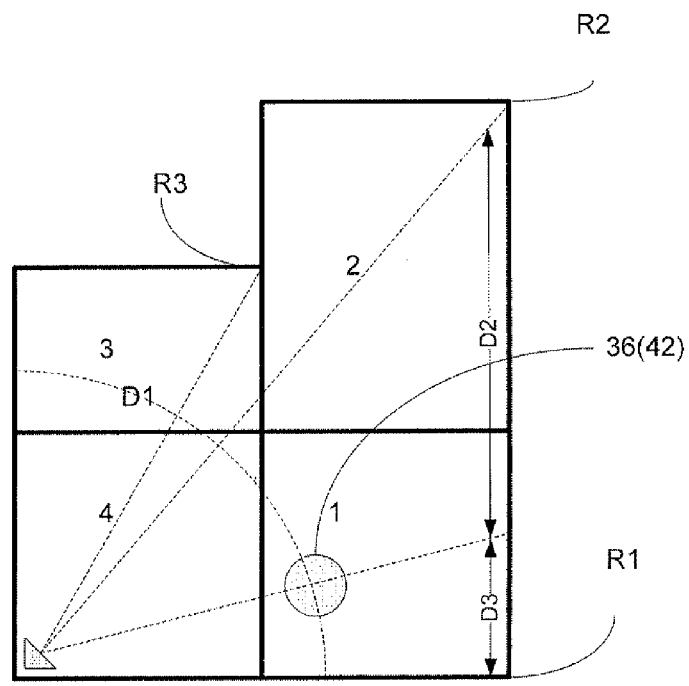
FIG. 6A is an illustration of using a detected image to determine the position of the occupant within the space of FIG. 4
Figure 6B:
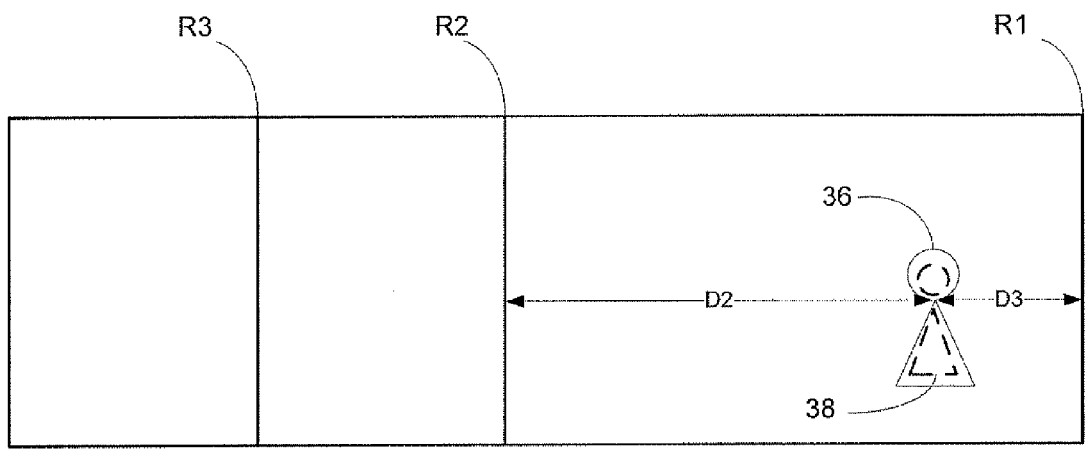
FIG. 6B is an illustration of Canny edge processed image and a base image used to determine the presence and position of an occupant within the space of FIG. 4.

In order to detect an occupant in the space, the image data is analyzed. One advantage of using image data to determine occupancy is that the occupant may be detected regardless of movement. Hence, a person sitting still and reading at their desk will be detected whereas some conventional systems lose track of the person sitting still and issue control signals, such as turning off lights, based on the erroneous detection. The analysis may be performed by the BAS 10, the image processing system 20, or any processor configured to receive an image from the IPOS. Occupant detection may be performed through Canny edge detection, blob detection or other image processing techniques. With Canny edge detection, the IPOS captured image data is processed to generate an image highlighting the edges in the original image. In an image of a space that includes an occupant, the Canny edge detection processed original image results in an image showing the outline of the person or persons in the space. The Canny processed image is then compared to typical human profiles to identify a match and hence the presence of one more people within the room. It is possible that several images from the IPOS device may be captured and repeatedly compared to the human profile information. Such successive or repeated comparisons may be compared to human profile Upon capturing an image of the space and detecting an occupant within the space, the system identifies the location or locations of the occupant or occupants within the room (operation 320). In the first operation, while defining the zone matrix for the space, the matrix is associated with dimensions of the space as well as the location of the IPOS. Further, the IPOS device may be registered against various static features in the room, such as corners of the room or pillars in the room, and dimensional associations are established between the IPOS device and the static features. FIGS. 6A and 6B illustrate one example of occupant position identification with respect to the space 26 of FIG. 4, each corner of the room is registered in the IPOS (R1, R2, R3). The IPOS includes one or more reference occupant images, which may be in a similar image outline form as generated through Canny edge detection. The reference occupant images may include a set of reference images for an average size adult. Referring to FIG. 6B relative to the registrations (R1, R2) the image shown places the occupant 36 in the space 26. The processed image 36 is then compared with the reference image 38 (dashed) or images to determine the dimensional difference between the captured image and the reference image. The difference is then used to determine the distance (D1; FIG. 6A) of the occupant from the IPOS device. The position (D2, D3) of the occupant 36 is based on the relative positioning of the occupant 36 compared to registrations R1, R2 and R3. The IPOS, knowing the space dimensions and registration features, which can be captured in the image data, is thus able to determine the position of the occupant(s) in the space.

It is also possible to configure a given space with two or more IPOS devices and use a form of triangulation to identify the position of occupants within the space. For example, if each IPOS device is initially defined, through the GUI, at a fixed position in the space and the registrations and relative distance between the IPOS devices are known, one of the IPOS devices, the BAS system, or other computing system can use triangulation to determine the location of the occupant in the space.

Figures 7, 7A, 8:
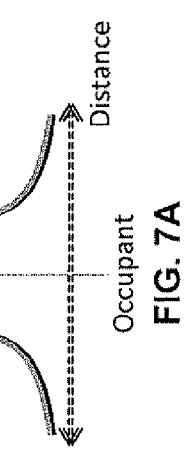
FIG. 7 is a zone map of FIG. 5 including occupant data associated with a particular cell.
FIG. 7A is a smoothing function.
FIG. 8 illustrates the zone map of FIG. 7 processed according to the smoothing function shown in FIG. 7A.

When the positions of the occupants in the space are identified, the positions are assigned to a cell in the zone matrix for the space (operation 330). For example, as shown in FIG. 7, the number 4 is assigned to the center left cell of the region 1 portion of the zone map 28. This means that the system determined that four occupants were within the space 26 and generally located in the area associated with region 1 and particularly the area of region 1 associated with the identified cell.

Turning now to FIG. 8, the occupancy data (at the cell level) is processed according to a smoothing function that distributes the occupancy across cells adjacent the cell including the occupant(s) (operation 340). Smoothing the occupant data establishes a point from which the BAS may optimize control of the occupied space and its surroundings. With the initial occupant data, the BAS knows where occupants are positioned in the space, within some margin of error in the system. It is possible to initiate control of various elements based on occupant presence or position data without any smoothing. For example, all room lighting may be switched on when an occupant is detected within the room. Or, a lighting element associated with the occupant cell may be turned on, alone or with adjacent lighting elements. Smoothing the occupant position data, however, allows the system to more precisely fine tune or optimize element control and enhance performance robustness. For example, as discussed below, after smoothing, lighting elements 34 associated with the area of occupancy may illuminated at varying degrees of brightness which enables optimal lighting for the occupant in the space and optimal energy usage by reducing illumination at points further from the area of occupation.

In one example, a smoothing function, represented by FIG. 7A, is used to smooth the occupancy data. The width and steepness of the smoothing function may be user programmable and hence the smoothing of the occupancy data may be programmable. It is also possible to construct an appropriate smoothing function using a pair of interacting sigmoid functions, a sinusoidal function, a Gaussian distribution, etc. to produce a gradually diminishing value centered around a position. One possible result of application of the smoothing function, using the occupancy data cell assignment from FIG. 7, is shown in FIG. 8. Here, cells immediately adjacent (either directly above, below, right or left) the occupant cell 42, are assigned a value of 3.2. Cells angularly adjacent the occupant cell are assigned a value of 3. Other cells, depending on their distance from the occupant cell, are assigned values of 1.9, 0.9, 0.5, and 0, while the cells associated with the space not visible to the IPOS device remain −1.

Figure 9:
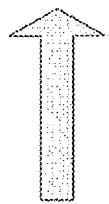
FIG. 9 illustrates the various smoothed data of FIG. 8 offset.

In the particular methodology depicted in FIG. 3, the smoothed occupancy data is shifted (operation 350). More particularly, the smoothed occupancy cell data values are each offset by an integer value of 1 as shown in FIG. 9. Shifting the occupancy data is used as a mechanism to further process the data in later steps. Like other operations set out in FIG. 3, operation 350 may not be necessary depending on the given implementation. Moreover, it is possible to shift the values by some other value, whether integer or otherwise, depending on the implementation. Shifted by 1, the −1 values become 0, the 0 values become 1, the 0.5 values become 1.5, etc.

Figure 10:
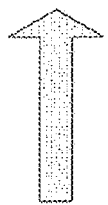
FIG. 10 illustrates the smoothed and offset data of FIG. 9 normalized.

After shifting (or offsetting) the matrix cell values, the cell values are normalized (operation 360). In the example illustrated in FIG. 10, the shifted cell values are normalized in a range of 0 to 1. Hence, the lowest shifted value of 0 is normalized to 0, and the highest shifted value of 5 is normalized to 1. The remaining values are distributed across the range of 0 to 1. In the example of FIG. 10, a normalization multiplier of 0.2 is used (5×0.2=1) and values are rounded up to the nearest decimal value. For example, the cells with a value of 4.2 are normalized to 0.9 (4.2×0.2=0.84, rounded up to 0.9). In other examples, cell values of 4 are normalized to 0.8 (4×0.2=0.8, no rounding necessary) and cell values of 2.9 are normalized to 0.6 (2.9×0.2=0.58, rounded up to 0.6).

Control optimization may occur based on the normalized cell values (operation 380). For example, lighting control signals may be transmitted to one or more lighting elements associated with one or more cells where normalized values function as a dimming multiplier. Again, for illustrative purposes a one-to-one correspondence between elements and cells is illustrated, but no such one-to-one correspondence is necessary. In the example shown, a cell value of 1 results in full lighting, a value of 0.9 delivers 90% brightness (10% dimming), and so on. However, as shown for example in FIG. 11, in the particular implementation illustrated in FIG. 3, following normalization, the normalized cell values are assessed on a region by region basis to obtain a mean value for each region (the sum of the cell values for a given region divided by the number of cells in the region) (operation 370). Hence, for example, relative to region 4, the mean value is (1+0.9+0.9+0.9+0.8+0.8+0.6+0.4+0.4)/9=0.75.

The region based multipliers are then used to produce signals to various possible controllable elements of the space in order to optimize control for the overall space. Continuing with the example of illumination, the multipliers may be applied to control illuminations to various lighting elements within each region (34(1)-34(4)). In such an example, an additional normalization step or other factoring may occur such that the highest value is associated with 100% illumination. The lighting element control signals are then applied on a regional basis such that all of the elements within region 1, associated with the highest region multiplier, are provided with a 100% illumination signal (no dimming).

The multipliers may be used in conjunction with a daylighting provision such that the multipliers are normalized to a value less than 1 (less than 100% illumination) depending on other daylighting information (time of day, date, weather, etc.). The term "daylighting" refers generally to the use of windows, reflective surfaces, and the like to provide natural indoor lighting, and "daylighting" information refers to information that the BAS uses in order to determine the amount of natural indoor light in any particular environment. For example, the BAS system may be programmed with daylighting measurements for a given region taken at various times and across various days of the year. The system may also be programmed with a nominal daylight value (such as through one or more measurements) and the nominal daylight measurement may be adjusted depending on the time and day of the year. The system may also be programmed to capture daylighting values for a given region. For example, the IPOS device may be programmed to capture an image of the space whenever it is unoccupied and not artificially illuminated, and the BAS system may compute one or more luminance values for the space, each region, or otherwise, and use the luminance value (or values) as the assumed daylight value for the area. The daylight values may then be used in conjunction with the region multipliers to optimize illumination for the space. The IPOS device may also capture values over time to develop a daylighting database of luminance values, with each value associated with a day and time, and use the database values in conjunction with the region multipliers to provide illumination control. Hence, to account for daylighting in an occupied region, such as region 1, an illumination value of less than 100% may be sent to the elements in region 1. The overall illumination of a given space will be optimized to provide the occupants with sufficient light while taking advantage of natural light such that less energy may be used to artificially illuminate the space.

In order to account for occupant movement in the space and possible errors in assessing occupant position, it is possible that images will be captured and processed at regular and relatively fast intervals, e.g., 60 times per minute. As occupants are detected in different areas of the space or move through the space, illumination and other forms of control may have to change. In the specific example of illumination, abrupt and quick changes may be distracting to the occupants; hence, it is possible to process the regional multipliers with an asymmetric-time domain filter or other form of filter to account for and otherwise attenuate quick changes. In the specific case of an asymmetric-time domain filter, the filter may have fast rising and slow falling characteristics. Hence, for example, as an occupant moved upward from region 1 to region 2, region 1 values may decrease relatively slowly compared to region 2 values that may increase quickly. Hence, the illumination of region 2 may increase quickly as the occupant moved toward and into region 2, whereas illumination of region 1 may decrease slowly as the occupant moved from region 1 into region 2.

In another example, the regional multipliers generated in operation 370 are applied to nominal ventilation commands for direct ventilation control in each region. For example, ventilation ducts in a given space may be fitted with diffusers to control the amount of air flow form the ventilation ducts into the space. In such an implementation, a nominal ventilation command to region 2 ventilators (e.g., diffusers) may be processed according to region 2 multiplier of 0.26. If a signal for full open diffusers is provided to the region 2 diffusers, the signal may be reduced to 0.26—the diffusers being open to 26% of maximum in region 2 rather than full open. Hence, air is provided to region 2 but less air than under conventional operation conditions (i.e., without image based occupant detection and position sensing).

Aspects of the present disclosure may also be used to determine a centroid of occupancy in a region or entire space, and elements within the region or space controlled accordingly. To illustrate the use of centroid, take for example the case where the system detects single occupants in the center of each of the four regions depicted in FIG. 4. The system will calculate a centroid of occupancy for the space based on the individual occupants in each region. The centroid may be located at approximately the intersection of the four regions near the middle of the space. In this example, the centroid indicated as a single occupant, the four occupants, or otherwise, may be assigned to the cell associated with the calculated position of the centroid. This value may be used in operation 330 of FIG. 3, and the subsequent steps may be performed to generated control values in order to control various elements based on the centroid of occupancy. In such a configuration, the smoothing function may be more gradual to spread illumination and ventilation more evenly across the room from the centroid. Additionally, the smoothing function may take into account the number of occupants in the space as well as other factors.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any tangible mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow. While a number of examples of aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A method of controlling building equipment comprising:
   receiving an image from an image sensor placed in a space associated with the building, the image including information representative of one or more occupants in the space;
   at a first processor coupled with a memory storing the image, determining, from the image, a presence of one or more occupants within the space;
   associating the image with a matrix that defines a dimensional representation of the space, wherein the matrix subdivides the space into a plurality of regions each with one or more cells within each region; and
   assigning an occupant value for each of the one or more cells based on a determination of a relative position of any detected occupants within the space with respect to a position of a registered feature appearing within the image; and
   providing a control signal to one or more controllable building elements within a first cell of a first region based on the occupant value assigned to the first cell.

2. The method of claim 1 further comprising:
   at the first processor coupled with the memory storing the image, determining a position of the one or more occupants in the space.

3. The method of claim 1 further comprising:
   from a second processor in communication with the first processor,
   providing the control signal to the one or more controllable building elements based on the relative position of a detected occupant in the space.

4. The method of claim 3 further comprising:
   providing the control signal to the one or more controllable building elements based on at least one of a presence of the one or more occupants in the space or the position of the one or more occupants in the space, and at least one luminance value associated with the space.

5. The method of claim 3 wherein the controllable building elements include one or more of a dimmable lighting element, a variable ventilation element, a heating element or a cooling element; the method further comprising one or more of:
   providing a first control signal to the dimmable lighting element to illuminate the lighting element based on the occupant value for each of the one or more cells;
   providing a second control signal to the variable ventilation element to provide ventilation to the space based on the occupant value for each of the one or more cells;
   providing a third control signal to the heating element to provide heating to the space based on the occupant value for each of the one or more cells; or
   providing a fourth control signal to the cooling element to provide cooling to the space based on the occupant value for each of the one or more cells.

6. The method of claim 1 further comprising:
   in the memory, storing digital image data from the space associated with the building, the digital image data including information representative of one or more occupants in the space;
   at the first processor coupled with the memory storing the digital image data, processing the digital image data using a Canny edge detection method, the processed digital image data providing image data representative of the one or more occupants in the space; and
   at the first processor, comparing the processed digital image data to at least one reference data set to identify the relative position of the one or more occupants in the space.

7. The method of claim 6 further comprising:
   associating the one or more controllable building elements with the one or more cells, and providing the control signal to the one or more controllable building elements based on the occupant value for the one or more cells associated with the one or more controllable building elements.

8. The method of claim 6 further comprising, at the processor coupled with the memory storing the digital image data:
   applying a smoothing function to the occupant values for each cell to provide smoothed occupancy values for each cell;
   applying an offset to each smoothed occupancy value to provide offset occupancy values for each cell;
   normalizing the offset occupancy values on a region basis to provide normalized values for each cell;
   determining a mean value for each region to yield occupancy control values; and
   providing the control signal to the one or more controllable building elements in each region based on the yielded occupancy control values.

9. The method of claim 1 further comprising:
   providing a control signal to one or more controllable building elements within a second cell based at least in part on the occupant value assigned to the first cell.

10. The method of claim 1 further comprising:
    at the first processor coupled with the memory storing the image, determining a position of one or more occupants in the space;
    at the first processor coupled with the memory storing the image, calculating a centroid of occupancy of the one or more occupants in the space based on the position data; and
    providing the control signal to the one or more controllable building elements based on the calculated centroid of occupancy.

11. A building management system comprising:
    an image processing occupancy sensor comprising:
    at least one image sensor; and
    at least one first microprocessor coupled with at least one memory, the microprocessor and memory configured to receive and store an image from the image sensor, the at least one memory including computer executable instructions comprising:
    a first set of instructions to identify an occupant within the image;
    a second set of instructions to determine the position of an occupant in a space associated with the image processing occupancy sensor and provide data indicative of the position of the occupant in the space;
    herein the second set of instructions further causes the at least one first microprocessor to:
    associate the image with a matrix that defines a dimensional representation of the space, wherein the matrix subdivides the space into a plurality of regions with one or more cells within each region; and
    assign an occupant value for at least one of the one or more cells based on a determination of a relative position of the occupant with respect to a position of a registered feature appearing within the image; and
    wherein the data indicative of the position of the occupant in the space is determine from the relative position.

12. The building management system of claim 11 further comprising:
at least one second microprocessor in communication with the at least one first microprocessor, the at least one second microprocessor coupled with at least one second memory, the at least one second microprocessor and second memory including computer executable instructions comprising a third set of instructions to control one more controllable elements in the space based on the position of the occupant in the space.

13. The building management system of claim 12 wherein:
the controllable building elements include one or more of a dimmable lighting elements, a variable ventilation element, a heating element or a cooling element;
the at least one second microprocessor coupled with the at least one second memory including one or more computer executable instructions comprising:
at least one fourth set of instructions to provide a first control signal to the dimmable lighting element to illuminate the lighting element based on the position of the occupant in the space;
at least one fifth set of instructions to provide a second control signal to the variable ventilation element to provide ventilation to the space based on position of the occupant in the space;
at least one sixth set of instructions to provide a third control signal to the heating element to provide heating to the space based on the position of occupant in the space; or
at least one seventh set of instructions to provide a fourth control signal to the cooling element to provide cooling to the space based on the position of the occupant in the space.

14. The building management system of claim 12, the third set of instructions to provide the control signal to the one or more controllable building elements based on at least one of the presence of the one or more occupants in the space or the position of the one or more occupants in the space, and at least one luminance value associated with the space.

15. The building management system of claim 12, wherein the second set of instructions is stored in the second memory and further causes the second processor to determine the relative position of the occupant with respect to a position of the registered feature appearing within the image.

16. The building management system of claim 15, the at least one second microprocessor and second memory including computer executable instructions comprising:
a sixth set of instructions to associate the one or more controllable building elements with one or more cells;
the third set of instructions to provide the control signal to the one or more controllable building elements based on the occupant value for the one or more cells associated with the one or more controllable building elements.

* * * * *